Aug. 6, 1940.   C. E. MILLER   2,210,092
SPINDLE WORK CLAMPING MECHANISM
Filed March 5, 1937
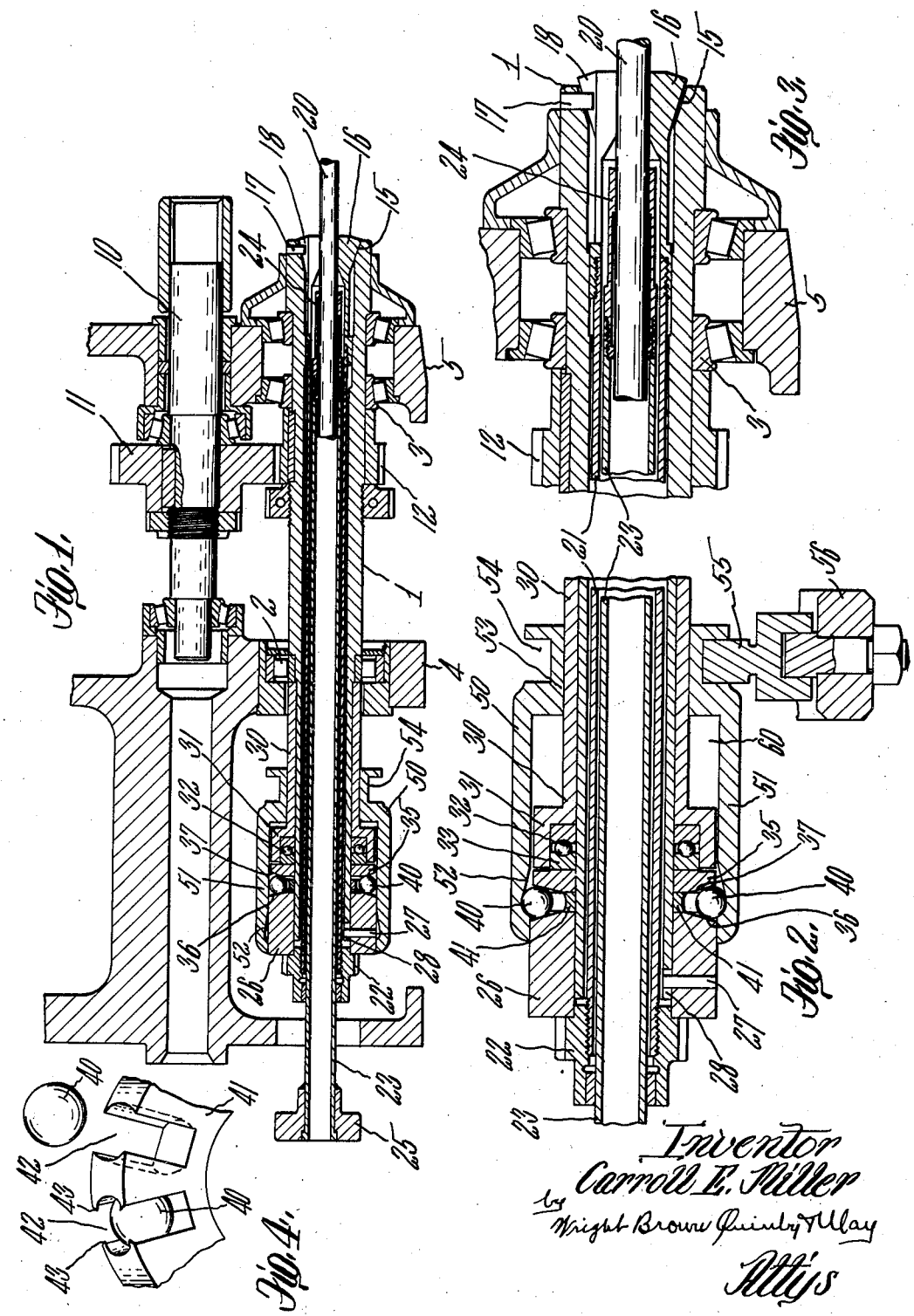
Inventor
Carroll E. Miller
by
Wright Brown Quinby & May
Attys Patented Aug. 6, 1940

2,210,092

UNITED STATES PATENT OFFICE 2,210,092

SPINDLE WORK-CLAMPING MECHANISM

Carroll E. Miller, Windsor, Vt., assignor to Cone Automatic Machine Company Inc., Windsor, Vt., a corporation of Vermont Application March 5, 1937, Serial No. 129,175

4 Claims. (Cl. 279—51)

This invention relates to mechanism for clamping and releasing work within a hollow work spindle such as is employed, for example, in automatic lathes and screw machines. One object of this invention is to improve the work-gripping and releasing operation, more particularly to render the releasing of the work, as from a spring collet clamping device, more certain and smooth than heretofore.

A further object is to produce these desirable results in a simple and inexpensive manner.

For a more complete understanding of this invention, reference may be had to one embodiment of the invention shown by way of example and not of limitation, in the accompanying drawing in which Figure 1 is a fragmentary longitudinal cross section through a work spindle and related parts of a multiple spindle automatic lathe, this work spindle embodying this invention, and the work gripping means being shown in this figure in gripping positions.

Figures 2 and 3 are detail sections similar to portions of Figure 1, but to a larger scale and showing the gripping means in released positions.

Figure 4 is a fragmentary perspective showing the ball retainer ring and the method of securing the balls in place therein.

Referring to the drawing, at 1 is shown a work spindle mounted in bearings 2 and 3 in spaced wall members 4 and 5 of a turret of a multiple spindle machine. As shown the work spindle, which is hollow, is rotated by the rotation of a central shaft 10 journaled in the wall members 4 and 5 and coaxial with the turret. This shaft 10 carries a gear 11 which meshes with a gear 12 on the spindle 1, it being understood that there are a plurality of such spindles arranged in parallel relation and in circular array about the turret axis, each of which has a gear 12 meshing with the gear 11 of the drive shaft 10. The spindle 1 shown is provided with an internal wedge face 15 at its end for cooperation with a spring collet 16 which may be held for rotation with the spindle 1, as by means of pin 17 projecting from the spindle and engaging in a slot 18 in the collet. The work is shown at 20 and it will be evident that by moving the collet to the left, as shown in Figures 1 and 3, the wedge face 15 of the spindle engaging the outer tapered portion of the collet forces the jaws of the collet inwardly into gripping relation to the work. This collet is shown as secured to the forward end of a tube or sleeve 21 which extends lengthwise within the hollow spindle and this tube is shown as adjustably secured as by a threaded connection at its opposite end to a collar 22. Within the tube 21 is a stock pusher sleeve 23 having a stock gripper 24 at its forward end. This stock pusher sleeve 23 extends through the rear or left hand end of the collet tube 21 and has secured to this end a head 25 by which it may be manipulated to feed the stock forward when the collet is open and to slide rearwardly to take a fresh grip on the work back from its former position when the collet is closed so that the work cannot retract with the pusher. Axially slidable on the rear end of the spindle is a collar 26 which bears on the collar 22. The collar 26 is provided with a pin 27 which rides in a slot 28 in the spindle so that the collar 26 rotates with the spindle, but it may be moved to the left thereon in order to carry the sleeve 21 and the collet to the left to grip the work, and it may be moved to the right in order to permit the collet to spring away from the work and thus release it. Somewhat to the right of the collar 26 is positioned the rear end of a sleeve 30, the forward or right hand end of which bears against the rear face of the inner ring of the bearing 2. The sleeve 30 forms in effect a part of the spindle. The left hand end of the sleeve 30 is provided with an outwardly offset portion 31 within which is seated a thrust ball bearing 32, and bearing against the rear raceway 33 of this bearing is a collar 35. The collars 26 and 35 are provided with oppositely disposed wedge end faces 36 and 37, respectively, these wedge faces approaching each other more closely toward the axis of the spindle and diverging outwardly therefrom. Between these wedge faces are positioned a plurality of elements 40 shown herein as balls. When these balls are pressed radially inwardly they act to separate the collars 26 and 35 from each other, thus pressing the collar 22 to the left, carrying with it the collet tube 21, causing the collet to be moved axially to work-gripping position, while when the elements 40 are allowed to move outwardly from the spindle axis into the position shown in Figure 2, the collars 26 and 35 are allowed to approach each other as far as is permitted by a ball retainer ring 41, this permitting the collet 16 to move axially to the position shown in Figure 3 to release the work.

The construction of the ball-retaining ring 41 is best shown in Figure 4. This ring as herein shown is of less thickness than the diameters of the balls 40 and it is formed to receive these balls as by drilling inwardly in a radial direction a series of openings 42 of a size to permit the balls to enter therein from the periphery of the ring and to project out laterally from opposite faces thereof. When the ball is in position the corners 43 of the corresponding opening 42 are bent inwardly, as shown at the left hand opening 42 in Figure 4, so as to effectively reduce the size of the entrance through which the ball was inserted thus to provide spaced retaining fingers which limit the extent to which each ball may be pulled out to project from the periphery of the retaining ring and which space the balls angularly around the spindle. This prevents the balls from collecting together on one side of the spindle, which would greatly impair the operating mechanism.

The balls may be forced to inward or work-gripping position as by means of a sleeve 50 having a tubular portion 51 slidably engaging the outer face of the collar 26. This tubular portion 51 is provided with an annular recess 52 near its open end and when this recess is positioned opposite to the balls 40, as shown in Figure 2, these balls may project outwardly from the face of the collar 26, thus permitting the collet to spring away from the work. When the collar 50 is moved to the left, however, into the position shown in Figure 1, the smaller inside diameter part of the tube 51 engages on the outer faces of the balls and crowds them inwardly toward the axis of the spindle, thus to crowd the collar 26 to the left and force the collet into work-gripping position shown in Figure 1. The sleeve 50 is provided with a reduced diameter portion 53 which closely engages and slides on the sleeve 30, and this smaller diameter portion may be provided with an annular groove 54 within which may ride a shoe 55 on an arm 56 which may be moved axially of the spindle, thus to move the sleeve 50 with it. This shoe 55 may be so supported that as the turret is indexed the collars 50 of the several spindles come successively into cooperative engagement therewith.

While centrifugal force from the rotation of the spindle is exerted on the balls 40 when the sleeve 50 is moved to the right into the position shown in Figure 2, in order to move the balls to collet-releasing position, a further effect to free the collet for motion to releasing position is exerted, this as shown being by a pressure differential produced on opposite faces of the collar 26. It will be noted that the reduced diameter portion 53 of the collar 50 provides between it and the right hand face of the portion 31 and the right hand face of the collar 36, a variable capacity chamber 60, there being clearance between the inner face of the sleeve 50 and the portion 31. When the collet is in work-gripping position, as shown in Figure 1, this chamber 60 is of comparatively small volume, while when the sleeve 50 is moved to the collet-releasing position shown in Figure 2, this volume 60 is substantially increased, thus producing when this motion is quickly effected a rarefication of the air within it, and a fluid pressure differential on opposite faces of the collar 26, the outer or rear end of which is exposed to the atmosphere. The excess pressure of this atmosphere over that within the chamber 60 acts to move the collar 26 to the right so that this collar 22 and the collet sleeve 21 are free to move 21 to the right, thus to separate the cooperating face of the collet from the wedge face 15, as shown in Figure 3, so that the collet may free itself from the work by its inherent resiliency. The sleeve 50 thus acts as an open ended cylinder within which is slidable a piston which comprises the collar 26, and which is subject on its outer face to atmospheric pressure and on an annular portion of its inner face to the pressure within the chamber 60 within the cylinder. Thus, beside the tendency due to the resiliency of its gripping fingers for the collet to move axially, so that its outer face may ride up the wedge face 15, the effect of this suction or pressure differential is to increase this freeing axial motion so that the complete freeing of the work is insured.

While this invention has been shown as applied to a work spindle of a multiple spindle machine, it will, of course, be evident to those skilled in the art that the number of spindles employed is immaterial and that the invention may find a much wider field of commercial value. It will also be understood by those skilled in the art that many changes and modifications may be made without departing from the spirit or scope of this invention as defined by the appended claims.

I claim:

1. The combination with mechanism comprising a hollow work spindle, a spring collet for gripping work in said spindle, said spindle having wedge means cooperating with said collet as said collet is pressed in one direction to grip the work, a pair of collars coaxial with said spindle, one of said collars having operative connections with said collet and the other of said collars having bearing against said spindle, said collars having opposed wedge faces, elements positioned between said faces and movable toward and from the axis of said spindle to wedge said collars apart to move said collet to gripping position or to permit said collars to approach each other thereby permitting said collet to release the work, of a sleeve movable axially of and slidably guided on said spindle and engageable with said elements, in one axial position forcing said elements toward said axis to hold said collet in work-gripping position and having an enlarged internal diameter portion permitting said elements to move outwardly from said axis and release said collet when said sleeve is in different axial position, one of said collars slidably fitting within said sleeve and defining therewith a variable capacity chamber expanding to establish a differential air pressure on said movable collar when said sleeve is moved from collet-gripping to collet-releasing position, said differential air pressure being in a direction to free said collet for motion from said wedge means to thereby free said collet from the work.

2. The combination with a work spindle having work-gripping means, means movable axially of said spindle for tightening and releasing said gripping means, said movable means including a collar having a wedge end face, and a series of balls engaging said end face, of a sleeve slidably engaging said spindle and said collar at axially spaced positions and spaced from said spindle between said positions to form on one side of said collar a chamber of variable volume as said sleeve is moved axially, said sleeve having a surface portion of tapering internal diameter with which said balls may engage, the smaller diameter portion when engaging said balls forcing said balls inwardly to move said collar to tighten said gripping means and minimizing the volume of said chamber, and the larger diameter portion of said sleeve when brought opposite to said balls permitting them to move outwardly to release said gripping means and increasing the volume of said chamber, the other side of said collar being exposed to atmospheric pressure, movement of said sleeve to gripping means releasing position establishing through the increase of said volume a pressure differential on opposite sides of said collar in a direction to move said collar in gripping means releasing direction, and means for moving said sleeve.

3. The combination with a work spindle having work-gripping means, of means to actuate said gripping means to grip the work and to permit release of the work, said actuating means including parts cooperating to form a variable capacity chamber having a relatively large capacity when the work is released and a smaller capacity when the work is gripped, one of said parts comprising a member telescopically related to another part and having its outer face exposed to the atmosphere whereby as said parts are moved relatively to increase the capacity of said chamber a differential atmospheric pressure is exerted on one part tending to move said one part in a direction to reduce said capacity, and operative connections from said one part to said gripping means causing such movement of said one part to facilitate release of said gripping means from the work.

4. The combination with a work spindle having work-gripping means provided with a member movable axially of said spindle to grip and release the work, an element movable axially of said spindle, and means operatively interconnecting said element and member causing motion of said element in one direction to positively move said member to grip work and in the opposite direction to permit said member to move in work-releasing direction, of means comprising cooperative portions of said member and element establishing a fluid pressure differential at opposite sides of said member in a direction to free said member for motion to release the work when said element is moved in the direction to permit releasing motion of said member.

CARROLL E. MILLER.